United States Patent Office 3,214,489
Patented Oct. 26, 1965

3,214,489
POLYCARBONATE PLASTICIZED
POLYURETHANES
John C. Park, Cuyahoga Falls, Ohio, assignor to The
B. F. Goodrich Company, New York, N.Y., a corporation of New York
No Drawing. Filed Sept. 22, 1961, Ser. No. 139,837
5 Claims. (Cl. 260—858)

This invention relates to the preparation of hard thermoplastic polyurethanes which have high strength and good flexibility. More particularly it relates to polymeric compositions of aromatic polycarbonates and aromatic diisocyanates. The aromatic polycarbonate may or may not be chain extended with a free discrete glycol, and it is found desirable to add a relatively low-molecular weight hydroxyl terminated polyester to properly balance flexibility with hardness.

These new linear polymeric substances have been found to possess many interesting properties which make them adaptable to a variety of uses. They are thermoplastic resins. Shore D hardness ranges from 50 to above 90; ultimate tensile strengths are above 5,000 p.s.i.; first and second order transition temperatures are approximately 50° C. and 150° C.; abrasion resistance and weather resistance are excellent. They can be milled and calendered into film form or melt extruded into fibers.

The aromatic polycarbonates employed in producing the polymeric products of this invention are prepared from aromatic diols such as bisphenol A, alkoxy aromatic glycols including 1,4-bis-(2-hydroxyethoxy) benzene, and any aromatic diol in which the hydroxyl groups are alcoholic hydroxyl groups. For example, hydroquinone contains non-alcoholic hydroxyls attached to carbon atoms possessing a double bond and is not satisfactory in making polymers in the present invention. In contrast thereto, use of 1,4-bis(2-hydroxy ethoxy) benzene of the formula

results in excellent products having outstanding weather resistant characteristics. Alkoxy diols of the following general formula are a valuable and preferred class of materials:

HO—R'—O—R''—Ar—R''—O—R'—OH wherein R' is an aliphatic radical including those containing 1 to 10 carbon atoms such as, preferably, alkylene radicals containing 2 to 6 carbon atoms, R'' is a saturated divalent aliphatic radical having from 0 to 10 carbon atoms, and Ar is aromatic such as phenylene and is selected from the group consisting of —B—, —B—B—, —B—R'''—B—, —B—O—B—, —B—SO₂—B—, and —N— where B is a benzene residue, R''' is a lower saturated divalent aliphatic radical and N is a naphthylene residue. Typical of such alkoxy hydroxy aromatic materials useful in the practice of the invention are 1,4-bis-(2-hydroxy ethoxy) benzene; 1,4-bis(3-hydroxy butoxy) benzene; 4,4'-bis[(2-hydroxy ethoxy) penyl-di-methyl methane; 4,4-bis(2-hydroxy ethoxy) biphenyl; 1,3-bis(2-hydroxy ethoxy) benzene; 1,4-bis(6-hydroxy hexoxy) benzene; 1,4-bis(3-hydroxy propoxy) benzene and like di(hydroxy alkoxy) aromatic compounds. Such materials are ordinarily prepared by condensing with ethylene or other alkylene chlorhydrins or alkylene oxides an appropriate dihydroxy compound including such materials as hydroquinone, catechol, resorcinol and materials of the general formula

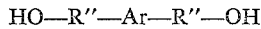

wherein R'' is a saturated divalent aliphatic radical containing from 0 to 10 carbon atoms, and Ar is an aromatic or cyclic nucleus including phenyl, biphenyl, naphthyl, diphenyl methane, diphenyl propane, and including phenyl dimethyldiol, phenyl diethanediol, phenyl dipropanediol, diphenyl diethanediol, napthyl dimethyldiol and the like and diphenyl sulphone, diphenyl ether, and the like.

The diisocyanates employed are aromatic diisocyanates and include such materials as dichlorodiphenyl methane diisocyanate, diphenyl methane-p,p'-diisocyanate, dimethyldiphenyl methane diisocyanate, diphenyldimethyl methane diisocyanate, bibenzyl diisocyanate, diphenyl ether diisocyanate, naphthylene diisocyanate, tolylene diisoycanate, bitolylene diisocyanate, para-phenylene diisocyanate, durene diisocyanate, dianisidene diisocyanate, meta-phenylene diisocyanate, tetrachlorophenylene diisocyanate, dimers of such diisocyanates and the like. Preferred for preparing polyesterurethane products of outstanding physical properties and outstanding weather resistance are meta-phenylene diisocyanate, durene diisocyanate, para-phenylene diisocyanate, tetrachloro-metaphenylene diisocyanate, bitolylene diisocyanate and the like.

The hydroxy terminated polycarbonates useful in preparing the hard polycarbonate-polyurethane resins of this invention may be prepared by reacting a diol with phosgene in the presence of an acid acceptor (the Schotten-Bauman reaction) or by transesterification by reacting a diol with a dialkyl or aryl carbonate in the presence of a catalyst. The Schotten-Bauman type reaction may be carried out either in a two-phase solvent system (e.g. water and methylene chloride) in which case an alkaline base such as sodium hydroxide is used as the acid acceptor, or it may be carried out in a single solvent using pyridine as the acid acceptor. In either case it is possible to control the molecular weight of the polymer by adjusting the amount of acid acceptor employed.

When the alternate method of transesterification of a diol with a dialkyl or aryl carbonate is used, an estimate of the progress of the transesterification can be made by weighing the reaction products. It is preferred to react about 2 mols of aromatic glycol to 1 mol of carbonyl compound in preparing the aromatic polycarbonate materials. Polycarbonate molecular weights of 300 to 1500 and even higher have been successfully prepared. The preferred molecular weight range of the aromatic polycarbonate is 400 to about 600; if the molecular weight is too high, the ultimate polyurethane polymers are too soft and have a high degree of permanent set. If the molecular weight is too low, the polymers are excessively brittle.

The polyurethane resins are made using lower molecular weight (preferably 400-600) hydroxy terminated polycarbonates prepared from aromatic glycols, with aromatic diisocyanates and modifiers. The modifiers are low-molecular weight aliphatic polyesters such as poly(tetramethylene adipate). Monomeric polyols such as butanediol-1,4 may also be added as chain extenders. The polyester modifiers impart flexibility to the resin; the polyol chain extenders permit the use of more diisocyanate which contributes to greater strength in the resin.

Preferred polyester modifiers for use in this invention are essentially linear hydroxyl terminated polyesters having a molecular weight between 600 and 1200 and an acid number less than 10. Molecular weight is determined by assay of the terminal functional groups and is an average molecular weight. The polyesters are prepared usually by an esterification reaction of an aliphatic dibasic acid or an anhydride thereof with a glycol. Molar ratios of more than 1 mol of glycol to acid are preferred so as to obtain linear chains containing a preponderance of terminal hydroxyl groups.

Polyesters used include those prepared from esterification of such dicarboxylic acids as adipic, succinic, pimelic, suberic, azelaic, sebacic, and the like or their anhydrides. Preferred acids are those dicarboxylic acids of the formula HOOC—R—COOH where R is an alkylene radical containing 2 to 8 carbon atoms.

Glycols used in preparation of the polyester by reaction with the aliphatic dicarboxylic acid are preferably straight chain glycols containing between 2 and 10 carbon atoms such as ethylene glycol, propylene glycol, butanediol-1,4, hexamethylenediol-1,6, and the like. In general, the glycol is preferably of the formula $$HO(CH_2)_xOH$$

wherein $x$ is 2 to 10; the preferred glycol is butanediol-1,4.

Monomeric polyols which may be also included in the preparation of the polycarbonate urethane resins of this invention to provide chain extension include the same glycols mentioned above. Again, butanediol-1,4 is the preferred material.

Preferred proportions for the reaction forming the polycarbonate urethanes of my invention are from 0.5 to 5.0 mols of aromatic polycarbonate to an equivalent amount of aromatic polyisocyanate. If other diols or polyesters are added, preferred proportions are 2 to 4 mols of diol such as butanediol-1,4 and from about 0.5 to 2.0 mols of polyesters such as poly(tetramethylene adipate). When extra diol or polyester or both are present, enough more diisocyanate will be required so that the mols of diisocyanate equals the sum of the mols of aromatic polycarbonate plus diol, plus polyester. The polycarbonate resin and any modifier that may be added are dried by heating 5–10 minutes at 120° C. under 1 mm. pressure. Enough aromatic diisocyanate is added to react with all the hydroxyl groups present and stirred until the mixture solidifies. The polymer is baked in an oven for several hours at 140° C. to insure complete cure. These polymers are hard, flexible and weather resistant. They can be molded or milled into sheets and can be melt extruded to form fibers and filaments.

Illustrative examples are set forth below to show the practice of this invention. Unless otherwise specified, parts are by weight.

PREPARATION OF POLYCARBONATE

Example I

A mixture was made of 118 g. of diethyl carbonate (1.0 mol), 396 g. of bis-1,4-(2-hydroxyethoxy)-benzene (2.0 mol) and 2 ml. of 10% sodium hydroxide in a 1 liter 3-necked flask equipped with stirrer, thermometer and a distillation head. This was heated and stirred until the theoretical amount of ethyl alcohol had been removed. Heating was continued at 1 mm. pressure and 200° C. for 2 hours. As the reaction progressed, excess polyol distilled off and the polymer became more and more viscous. The product polymer was dissolved in chloroform, deionized with amberlite resin (an ion exchange resin containing acidic groups) and vacuum dried. The product weighed 233 g. and molecular weight determined by hydroxyl analysis was 432.

Example II

A mixture of 57 g. bisphenol A (.25 mol) and 10.4 g. sodium hydroxide (.259 mol) was dissolved in 1000 ml. of water and 500 ml. of methylene chloride were added in a 4 liter resin kettle. The mixture was stirred rapidly at room temperature and phosgene was slowly bubbled in below the surface until the pH became acid. The solution was neutralized, filtered and the lower methylene chloride layer was separated. Polymer was precipitated as an oil by running this solution into ethanol and adding water. The solvent was evaporated under vacuum and the hard polymer obtained was vacuum dried. The molecular weight was 446.

Example III

A mixture of 49.5 g. of bis-1,4-(2-hydroxyethoxy)-benzene (.25 mol), 2000 ml. of dry dioxane and 34.9 g. of dry pyridine (.442 mol) was made. Phosgene was slowly bubbled in to form a voluminous precipitate. When the reaction was complete, the precipitate was filtered off and washed in water to dissolve pyridine hydrochloride. The dioxane solution was treated with water and precipitated polymer was filtered off and combined with the insoluble material above. The dry polymer was a white powder, 36.4 g. in weight with a molecular weight of 1485.

PREPARATION OF POLYURETHANE

Examples IV–VIII

The aromatic polycarbonate of Example I (mol wt.=432 was combined in various ratios with a poly-(tetramethylene adipate) having an hydroxyl number of 114, an acid number of 2.3 and a molecular weight of 984. Enough meta-phenylene diisocyanate (m-PDI) was added in each case to react with the available hydroxyl groups in the polycarbonate and the polyester. In Examples VI–VIII supplementary glycol in the form of butanediol-1,4 was added.

The polycarbonate and poly(tetramethylene adipate) were mixed and dried at 1 mm. pressure and 120° C. for 10 minutes. Next the diisocyanate or the diisocyanate plus butanediol was added with stirring. In about 2 to 3 minutes the mixture solidified. The clear, brown, hard polymers formed were baked for 3 hours at 140° C.

Physical tests were run on samples taken from 0.025 inch molded sheets both before and after samples were exposed for 154 hours in a weatherometer at 150° C. Proportions and test data are set forth in Table 1.

TABLE 1

| Example | Mols polycarbonate | Mols polyester | Mols extra glycol | Mols diisocyanate | Tensile (p.s.i.) | | Elongation, percent | | Shore Hardness |
|---|---|---|---|---|---|---|---|---|---|
| | | | | | Initial | After weather | Initial | After weather | |
| IV | 3 | 1 | | 4 | 11,480 | 12,000 | 100 | 25 | 65 |
| V | 4 | 1 | | 5 | 6,400 | 4,400 | <25 | 150 | 60 |
| VI | 3 | 1 | 4 | 8 | 7,200 | 7,200 | <25 | <25 | |
| VII | 1 | 1 | 2 | 4 | 4,080 | 4,400 | 150 | 150 | 65 |
| VIII | 1.5 | 0.5 | 2 | 4 | 5,360 | 6,000+ | 25 | 25 | 80 |

When diphenylmethane-p,p′-diisocyanate was substituted for meta-phenylene diisocyanate in the proportions used in Example VI, similar good physical data were obtained.

The polycarbonate urethanes prepared in Examples IV to VIII have good tensiles, are tough, flexible and abrasion and weather resistant. They extrude well and can be molded. They form extremely serviceable coverings for wires and exposed cables and the like.

I claim:
1. A composition of matter comprising the reaction product of an aromatic polycarbonate having a molecular weight of 300–1500 and hydroxyl group termination, an aromatic diisocyanate, and a low-molecular weight, linear hydroxyl terminated aliphatic polyester, said polyester having a molecular weight of 60–1200 and an acid number less than 10 and being a condensation reaction product of a dicarboxylic acid with a glycol.

2. A composition of matter comprising the reaction product of an aromatic polycarbonate having a molecular weight of 300–1500 and hydroxyl group termination, an aromatic diisocyanate, and a low-molecular weight, linear hydroxyl terminated aliphatic polyester, said polyester having a molecular weight of 600–1200 and an acid number less than 10 and being a condensation reaction product of a dicarboxylic acid with a glycol, said aromatic polycarbonate being prepared from an alkoxy aromatic diol by reaction of said diol with a member selected from the group consisting of dialkyl carbonates, diaryl carbonates and phosgene.

3. A composition of matter comprising the reaction product of an aromatic polycarbonate having a molecular weight of 300–1500 and hydroxyl group termination, an aromatic diisocyanate, and a low-molecular weight, linear hydroxyl terminated aliphatic polyester, said polyester having a molecular weight of 600–1200 and an acid number less than 10 and being a condensation reaction product of a dicarboxylic acid with a glycol, said aromatic polycarbonate being prepared from an alkoxy aromatic diol by reaction of said diol with a member selected from the class consisting of dialkyl carbonates, diaryl carbonates, and phosgene, said alkoxy aromatic diol having the formula HO—R'—O—R''—Ar—R''—O—R'—OH wherein R' is aliphatic radical including those containing 1 to 10 carbon atoms, R'' is saturated divalent aliphatic radical having from 0 to 10 carbon atoms, and Ar is phenylene.

4. A composition of matter comprising the reaction product of an aromatic polycarbonate having a molecular weight of 300–1500 and hydroxyl group termination, an aromatic diisocyanate, and a low-molecular weight, linear hydroxyl terminated aliphatic polyester, said polyester having a molecular weight of 600–1200 and an acid number less than 10 and being a condensation reaction product of a dicarboxylic acid with a glycol, said aromatic polycarbonate being prepared from an alkoxy aromatic diol by reaction of said diol with a member selected from the group consisting of dialkyl carbonates, diaryl carbonates, and phosgene, said alkoxy aromatic diol having the formula HO—R'—O—R''—Ar—R''—O—R'—OH wherein R' is aliphatic radical including those containing 1 to 10 carbon atoms, R'' is saturated divalent aliphatic radical having from 0 to 10 carbon atoms, and Ar is an aromatic group selected from the group consisting of —B—, —B—B—, —B—R'''—B—, —B—O—B—, —B—SO$_3$—B—, and —N— where B is phenylene, R''' is lower saturated divalent aliphatic radical, and N is naphthylene.

5. A composition of matter comprising the reaction product of an aromatic polycarbonate having a molecular weight of 300–1500 and hydroxyl group termination, a low-molecular weight, linear hydroxyl terminated polyalkylene polyester, said polyester having a molecular weight of 600–1200 and an acid number less than 10 and being a condensation reaction product of a dicarboxylic acid with a glycol, a monomeric aliphatic polyol chain extender and an aromatic diisocyanate.

References Cited by the Examiner
UNITED STATES PATENTS

| 2,789,964 | 4/57 | Reynolds et al. | 260—858 |
| 2,935,487 | 5/60 | Fox et al. | 260—858 |
| 2,299,844 | 9/61 | Muller et al. | 260—47 |
| 3,000,849 | 9/61 | Clachan et al. | 260—858 |
| 3,001,971 | 9/61 | Scott et al. | 260—47 |
| 3,023,192 | 2/62 | Shivers | 260—75 |

MURRAY TILLMAN, *Primary Examiner.*
LEON J. BERCOVITZ, *Examiner.*